United States Patent [19]

Chang

[11] Patent Number: 4,637,689

[45] Date of Patent: Jan. 20, 1987

[54] ACOUSTICALLY RESONANT TUNABLE ACOUSTO-OPTIC FILTER

[75] Inventor: I-Cheng Chang, Sunnyvale, Calif.

[73] Assignee: Itek Corporation, Beverly Hills, Calif.

[21] Appl. No.: 849,561

[22] Filed: Apr. 8, 1986

Related U.S. Application Data

[63] Continuation of Ser. No. 482,649, Apr. 6, 1983, abandoned, which is a continuation-in-part of Ser. No. 158,663, Jun. 12, 1980, abandoned.

[51] Int. Cl.$^4$ ............................ G02F 1/11; G02B 5/30
[52] U.S. Cl. .................................................... 350/372
[58] Field of Search ................................. 350/372–373, 350/358

[56] References Cited

U.S. PATENT DOCUMENTS

| | | | |
|---|---|---|---|
| 3,330,956 | 7/1967 | Wade | 350/358 |
| 3,679,288 | 7/1972 | Harris | 350/372 |
| 3,698,792 | 10/1972 | Kusters | 350/372 |
| 3,701,584 | 10/1972 | Runge | 350/372 |
| 3,729,250 | 4/1973 | Kusters et al. | 350/372 |
| 3,749,472 | 7/1973 | Daly et al. | 350/358 |
| 3,767,286 | 10/1973 | Kusters et al. | 350/372 |
| 3,944,334 | 3/1976 | Yano et al. | 350/358 |
| 3,944,335 | 3/1976 | Saito et al. | 350/358 |
| 3,953,107 | 4/1976 | Yano et al. | 350/372 |
| 3,982,817 | 9/1976 | Feichtner | 350/358 |
| 4,052,121 | 10/1977 | Chang | 350/358 |

OTHER PUBLICATIONS

Adrianova, I. I., "Study of a Photoelastic Light Modulator", Optics & Spectroscopy, 1-1963, pp. 70-74.
Harris et al, "Acousto-Optic Tunable Filter", Jr. Optical Soc. America, 6-1969, pp. 744-747.
Chang, I. C., "Noncollinear Acousto-Optic Filter with Large Angular Aperture", App. Physics Letts., 10-1974, pp. 370-372.
Cheng et al, "Photoelastic Modulator for the 0.55-1-3-$\mu$m Range", App. Optics, 8-1976, pp. 1960-1965.
Chang et al, "Programmable Acousto-Optic Filter", 1979 Ultrasonics Symposium, IEEE, pp. 40-45.
Feichtner et al, "Tl$_3$AsSe$_3$ Noncollinear Acousto-Optic Filter Operation at 10 $\mu$m" App. Phys. Letts. 1-1979, pp. 1-3.
Chang T. C., "Acousto-Optic Tunable Filters", Optical Engineering, 11/12-81, pp. 824-829.

Primary Examiner—William H. Punter
Attorney, Agent, or Firm—Roy L. Brown

[57] ABSTRACT

An acoustic resonant structure for use in a tunable acousto-optic filter to reduce drive power requirements. The undesirable ripples in the tuning bandpass response due to acoustic resonance is minimized by reducing the effective finesse of the filter.

11 Claims, 9 Drawing Figures

OPTICAL WAVENUMBER (ν)

OPTICAL WAVENUMBER (ν)

ACOUSTICALLY RESONANT TUNABLE ACOUSTO-OPTIC FILTER

DESCRIPTION

This application is a continuation of patent application Ser. No. 482,649, now abandoned, which was filed Apr. 6, 1983 for an ACOUSTICALLY RESONANT TUNABLE ACOUSTO-OPTIC FILTER and which was a continuation-in-part of abandoned application Ser. No. 158,663 filed on June 12, 1980.

TECHNICAL FIELD

The present invention relates generally to the field of tunable acousto-optic filters, and particularly, to an acoustic resonant structure for tunable acousto-optic filters to reduce drive power requirements.

BACKGROUND ART

Electronically tunable acousto-optic bandpass filters have been constructed so that a cone of light of first polarization is diffracted by an acoustic wave in an anisotropic medium (such as a birefringent crystal) to shift the light beam from the first to a second polarization at a selected bandpass of optical frequencies. The center wavelength of the passband of the acousto-optic filter is electronically tunable by changing the frequency of the acoustic wave within the crystal.

Two basic types of tunable acousto-optic filters have been constructed: collinear and noncollinear. In the collinear filter, the incident and diffracted light beams inside the birefringent crystal are collinear with the acoustic beam. The diffracted light beam at the selected passband is separated from the incident light beam by crossed polarizers. The collinear type of acousto-optic filter is disclosed in an article entitled "Acousto-Optic Tunable Filters" appearing on pages 744–747 in the June, 1969, issue of *The Journal of the Optical Society of America* (Vol. 59, No. 6), and in U.S. Pat. No. 3,679,288, entitled "Tunable Acousto-Optic Method and Apparatus."

In the noncollinear filter, the light beams inside the birefringent crystal are noncollinear with the acoustic beam. The diffracted light beam at the passband is separated from the incident light beam by either crossed polarizers or spatial separations. The noncollinear type of acousto-optic filter is disclosed in an article entitled "Noncollinear Acousto-Optic Filter with Large Angular Aperture," appearing on pages 370–372 of the Oct. 15, 1974, issue of the *Applied Physics Letters* (Vol. 25), and in U.S. Pat. No. 4,052,121, entitled "Noncollinear Tunable Acousto-Optic Filter."

The most significant feature of both the collinear and noncollinear tunable acousto-optic filter is that a narrow filter bandpass can be maintained for a relatively large cone of incident light. This large angular aperture characteristic is due to the proper choice of acousto-optic interaction geometry, wherein the tangents to the locus of the incident and diffracted light wave vectors are parallel. This condition of "parallel tangents" applies to both noncollinear and collinear acousto-optic filters.

For the remainder of this disclosure, "tunable acousto-optic filter" will be defined as an optical filter that operates on the basis of the "parallel tangents" type of acousto-optic diffraction in an anisotropic medium wherein the "parallel tangents" condition is satisfied. This type of tunable acousto-optic filter is clearly distinguishable from the type with small angular aperture as disclosed in U.S. Pat. Nos. 3,944,334, 3,944,335 and 3,953,107, all of which are entitled "Acousto-Optic Filters."

One of the principal disadvantages of a tunable acousto-optic filter is that its optical aperture is limited by the driving acoustic power. The problem is particularly severe for the infrared region since the drive power is proportional to the square of wavelength. One possible method to reduce the drive power is to operate the filter in an acoustic resonator configuration. At a frequency corresponding to one of the acoustic resonances, the acoustic energy inside the resonator is many orders of magnitude higher than that of a single pass traveling acoustic wave and as such the required external drive power is reduced. Despite this advantage, however, operating tunable acousto-optic filters using acoustic resonance has been considered impractical. Maximum filter transmission occurs only at discrete wavelengths that correspond to acoustic resonance peaks. When the passband wavelength of the acousto-optic filter is tuned by changing the acoustic frequency, the filter spectral responses are in the form of multiple resonances or combs. Such amplitude variation in the filter spectral response is undesirable, and is eliminated in previous art by damping acoustic resonance in the filter medium. Acousto-optic filters having means for damping acoustic resonances are disclosed in U.S. Pat. Nos. 3,729,250 and 3,767,286.

An acoustically resonant tunable acousto-optic filter with smoothly tuning spectral response based on electro-optic tuning was described in U.S. Pat. No. 3,701,584. The acoustic frequency is fixed at one of the acoustic resonance peaks to reduce the drive power. Tuning of the filter is accomplished by varying the birefringence of the filter crystal with the application of a voltage on the crystal. This method is limited to acousto-optic filter crystals that are also electro-optic. Moreover, the tuning range is limited due to the large tuning voltage required.

DISCLOSURE OF THE INVENTION

The point of the invention is the modifying of both collinear and non-collinear acousto-optic filters to reduce the finesse to a value wherein, for a given acoustical driving frequency, the successive resonances of the acoustical signal are sufficiently close together to cause the optical filter to have as flat a response as desired. In general, the smaller the finesse, the broader the optical passband and the smaller the ripple on that passband.

In a collinear acousto-optic filter, the finesse is decreased by increasing the path length of the acoustic signal within the filter.

In a non-collinear acousto-optic filter, the finesse is decreased by either increasing the path length of the acoustic signal or varying the angle, $\theta_i$, between the received illumination and the optic axis, "z", of the birefringent filter crystal.

A principal object of the present invention is the provision of an acoustically resonant tunable acousto-optic filter with smoothly tuning spectral response.

It is a more specific principal object of this invention to reduce the finesse of the birefringent crystal of an acousto-optic filter.

One feature of the present invention is that the passband wavelength of the acoustically resonant acousto-optic filter is tuned by changing the acoustic frequency at sampled discrete acoustic resonances.

Another feature of the present invention is that the acoustically resonant acousto-optic filter reduces the required drive power.

Another feature of the present invention is that the acoustically resonant acousto-optic filter increases the transducer impedance and reduces complexity of impedance matching circuitry.

It is likewise an object of the present invention to provide in a collinear acousto-optic filter, a composite acoustic resonator comprising a birefringent acousto-optic crystal and an acoustic prism coupler, wherein successive resonant peaks of the composite acoustic resonator are chosen to be predeterminedly close to obtain an optical spectral response of predetermined smoothness.

Another feature of the present invention is the provision, in a collinear acousto-optic filter, of an optical mirror internal to a composite acoustic resonator for coupling filtered light.

It is also an object of the present invention to provide, in a noncollinear acousto-optic filter, an acoustic resonator, wherein successive resonant peaks of the acoustic resonator are chosen to be predeterminedly close to obtain an optical spectral response which is predeterminedly smooth.

Other features and advantages of the present invention will become apparent from the following description when taken in conjunction with the accompanying drawings.

BEST MODE FOR CARRYING OUT THE INVENTION

Figure 1:
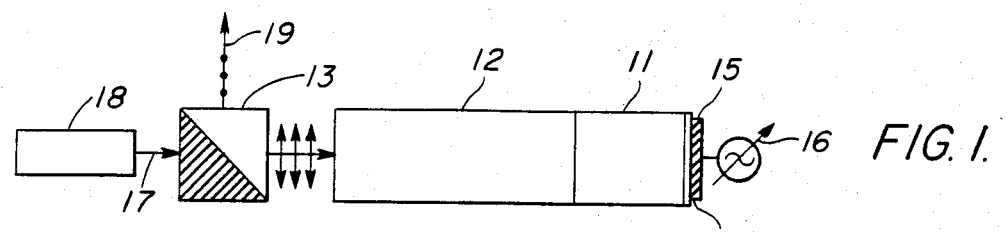
FIG. 1 is a schematic representation of an acoustically resonant, collinear acousto-optic filter in accordance with the present invention.

Referring to FIG. 1, an acoustically resonant, collinear acousto-optic filter of the present invention is shown diagrammatically. The collinear acousto-optic filter shown in FIG. 1 is of the reflective type in which the filtered light is reflected back toward the source. The filter is comprised of an optical anisotropic medium, such as a birefringent crystal 11, an acoustic prism coupler 12 in intimate contact with the birefringent crystal 11, and an input polarizer 13, as for example of the Rochon type, which also serves as an output analyzer. The end face 14, of the birefringent crystal 11, is provided with reflective coatings. A piezoelectric transducer 15 is bonded in intimate contact to the end face 14 of the crystal 11, and is connected to an RF sweep generator 16. Acoustic waves are generated by the transducer 15 and set up acoustic resonances in the composite resonator comprised of the birefringent crystal 11 and the acoustic prism coupler 12. The acoustic impedance of the acoustic coupler 12 is chosen to be nearly equal to that of the birefringent crystal 11. A light beam 17, from a light source 18 is polarized by the polarizer 13, enters the coupler 12, propagates and interacts collinearly with the standing acoustic waves inside the crystal 11, and is reflected by the coated surface 14, traverses again through the crystal and coupler and passes through the analyzer 13 as a filtered output light beam 19.

Figure 2:
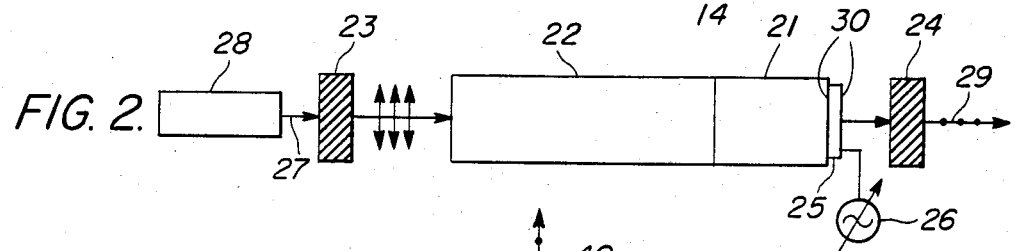
FIG. 2 is a schematic representation, according to this invention, of a second embodiment of an acoustically resonant, collinear acousto-optic filter.

FIG. 2 shows a schematic diagram of an acoustically resonant collinear acousto-optic filter of the transmission type. Specifically, the filter comprises a birefringent crystal 21 and an acoustic prism coupler 22 in intimate contact with the birefringent crystal 21. In place of the transducer with reflecting face in FIG. 1, a transparent transducer 25 with transparent top and bottom electrodes 30 is used instead. An RF sweep generator 26 is connected to the transducer 25 as shown. An input polarizer 23 and an output analyzer 24 are provided in the filter for the separation of the filtered light 29 from the incident light 27 from light source 28. The transducer 25 is bonded to the crystal 21 by an optically transparent bonding medium, such as Boxer epoxy available from Edmund Scientific Co. The optically transparent top and bottom electrodes can be provided, for instance, by thin films of indium and tin oxide or by the method described in U.S. Pat. No. 3,698,792.

Figure 3:
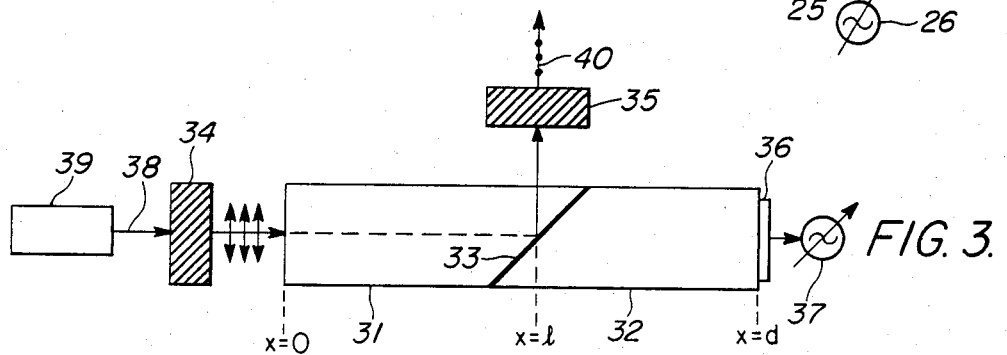
FIG. 3 is a schematic representation, according to this invention, of a third embodiment of an acoustically resonant, collinear acousto-optic filter.

Referring to FIG. 3, another configuration of the transmission type, a third embodiment of the acoustically resonant collinear acousto-optic filter of the present invention is shown diagrammatically. The filter comprises optical anisotropic medium, such as a birefringent crystal 31, an acoustic prism coupler 32, in intimate contact with the birefringent crystal 31 at the inclined face 33, an input polarizer 34, and an output analyzer 35. The inclined face 33 is provided with a reflective coating. A piezoelectric transducer 36 is bonded in intimate contact to one end of the prism coupler 32 and is connected to an RF sweep oscillator 37. Standing acoustic waves are excited in the composite resonator comprised of the birefringent crystal 31 and the acoustic coupler 32. A light beam 38, from a light source 39, polarized by input polarizer 34, enters the crystal 31, is reflected by the inclined face 33, propagates and interacts collinearly with the standing acoustic waves inside the crystal 31, and is passed through the output analyzer 35 as the filtered output 40. The acoustic prism coupler 32 can be of the same material as the birefringent crystal 31 or be any solid with an acoustic impedence nearly equal to that of the birefringent crystal 31.

The operation of the acoustically resonant tunable acousto-optic filter may be explained by considering the example of a $CaMoO_4$ acousto-optic birefringent filter crystal. Referring to FIG. 3, an acoustic wave is generated by the transducer 36 and launches into the $CaMoO_4$ birefringent crystal 31 via the acoustic prism coupler 32. For a $CaMoO_4$ crystal, the acoustic wave chosen is preferably a z-polarized, x-propagating shear wave (the z-axis refers to the (001) axis of a $CaMoO_4$ crystal and is perpendicular to the plane of FIG. 3, into the paper). For purposes of illustration, the acoustic coupler is assumed to be the same material as the birefringent crystal. Due to the reflections at the transducer end (x=d, where d is the combined length of elements 31 and 32) and the free boundary (x=o), a standing acoustic wave is set up in the acoustic resonator comprising the combined elements 31 and 32.

Figure 4A:
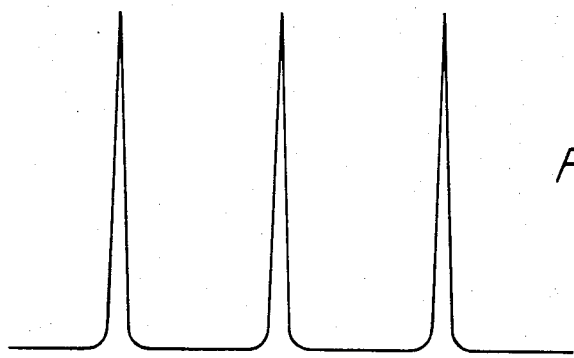
FIGS. 4a and 4b are curves of acoustic response plotted against acoustic frequency of frequency response of acoustic resonators.
Figure 4B:
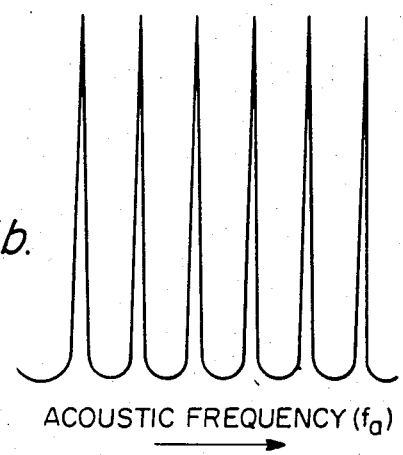

At the acoustic resonance frequencies, the steady state acoustic energy is significantly higher than that of a traveling wave. FIGS. 4a and 4b are graphs of acoustic amplitude response plotted against applied equal-amplitude driving acoustic frequencies, showing the frequency dependence of acoustic wave amplitudes in the acoustic resonator 31 together with 32. The acoustic resonance results in an enhancement in the diffraction efficiency of the acousto-optic filter. The efficiency enhancement factor, or equivalently the reduction in drive power, can be shown to be equal to the reciprocal of the one-way acoustic loss. The acoustic loss includes losses due to acoustic attenuation in the filter medium 31, 32 and reflection losses at the boundaries, x=0 and x=d. Significant reduction of drive power due to acoustic resonance can be achieved using a filter medium with low acoustic attenuation. For instance, in an acoustically resonant collinear $CaMoO_4$ filter, a reduction of drive power of 22 dB was demonstrated.

The separation in acoustic frequency between successive resonant peaks, 100A, 100B, 100C or 100D, 100E, 100F, 100G, 100H, 100J in the resonator is given by $\Delta f_a = V/2d$; where V is the acoustic velocity. For the collinear acousto-optic filter the acoustic frequency and optical wavenumber of the filter passband are related by $$V = f_a/V\Delta n \quad (1)$$

where $\Delta n$ is the birefringence of the filter medium.

As a result of the acoustic resonance, the tuning spectral responses of the filter are in the form of multiple resonance peaks or combs. The separation between the combs (in optical wavenumber) is given by $$\Delta \nu = \Delta f_a/V\Delta n = \tfrac{1}{2}d\Delta n \quad (2)$$

For a single resonant acoustic frequency, the filter transmission as a function of optical wavenumber is a $sinc^2$ $(sin\ V)^2/V^2$ type function. The filter resolution is usually measured by the Full Width at Half Maximum (FWHM) of the passband. For collinear acousto-optic filter, the FWHM is approximately given by $$\delta \nu = \frac{1}{2l\Delta n} \quad (3)$$

where l is the acousto-optic interaction length of the light beam. Another parameter of significance to this invention is the finesse, F.

The effective finesse is the ratio of the separation $\Delta \nu$, between the optical filter transmission peaks, due to the consecutive acoustic resonances, to the width of the passband $\delta \nu$ $$F = \frac{\Delta \nu}{\delta \nu} \quad (4)$$

Figure 4C:
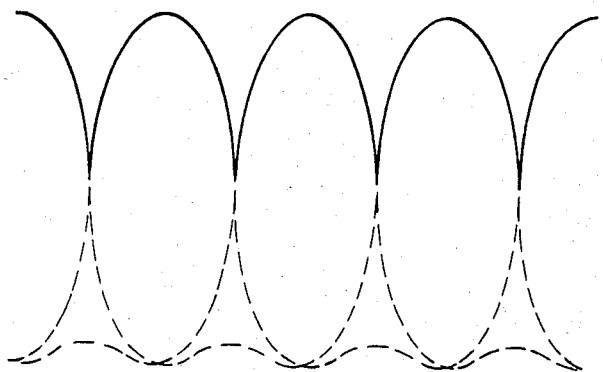
FIGS. 4c and 4d show the optical spectral responses for acousto-optic filters corresponding, respectively, to FIGS. 4a and 4b.

For the collinear filter $F \approx l/d$. In a conventional collinear filter structure where l=d and $F \approx 1$. The optical spectral response of an acousto-optic filter having a reasonably large finesse corresponding to FIG. 4a is shown in FIG. 4c. The dotted curves 104B, together with the solid curve 103B, show the bandpass response with the acoustic frequency resonant at only one of the acoustic resonances. The solid curve 103A-103B-103C shows the composite optical spectral response as the optical frequency is tuned through the optical frequencies corresponding to the acoustic resonant frequencies of FIG. 4a. It clearly shows the large variations or ripples in the transmission of the acousto-optic filter.

Figure 4D:
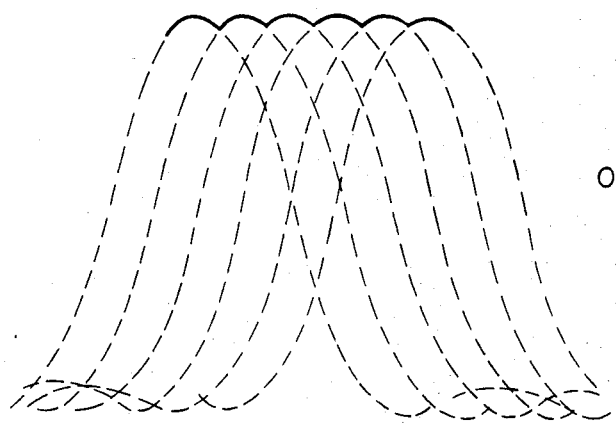

To reduce these ripples, it is desirable to have an acousto-optic filter with a small effective finesse, for example, an effective finesse of less than about 0.5 102A-102B-102C. This can be realized with the choice of large d compared to l in the collinear configuration of this invention. FIG. 4d shows the optical spectral response of an acoustically resonant acousto-optic filter with the acoustic frequency response shown in FIG. 4b. In this case $\Delta \nu << \delta \nu$. The optical bandpass response for successive resonant peaks are sufficiently overlapped to yield a nearly constant optical spectral response.

When the acoustic drive 16, 26, 37 is driven to a resonant frequency, 100A, 100B, 100C, substantially single optical frequency light beams are transmitted through the filter. The corresponding optical transmission $sinc^2$ curve (such as 103A-104A) controls the bandpass response at the optical frequencies. These curves are shown not only at 103A-104A but also at 103A-104A, 103C-104C, 103D-104D, 103E-104E. As the acoustic frequency is varied, the optical response follows the solid curve 103A-103B-103C. Note that with a decreased finesse, as in FIGS. 4b and 4d, variation of the acoustic frequency causes the optical response to follow a curve that has more variations, but the variations are less intense. If the finesse had been increased to the point that the curves 104A, B, C did not overlap at all before reaching zero, the optical response would follow the curves downward to zero, and the peaks 102A, B, C would also be farther apart.

Thus, there would be gaps in the optical passband with a very large finess, but a very small finesse would produce a very smooth passband as shown in FIG. 4d.

Figure 5:
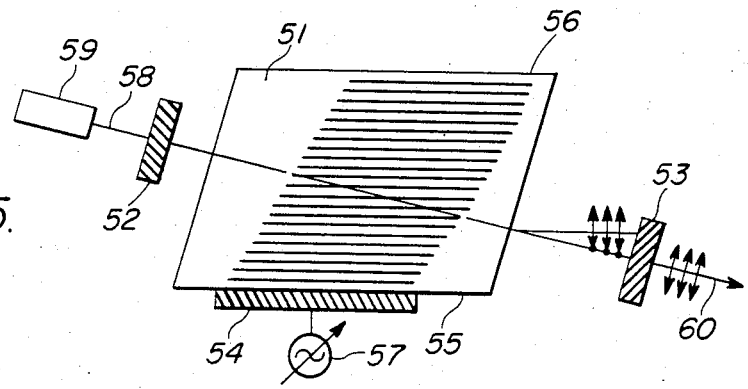
FIG. 5 is a schematic diagram of an acoustically resonant noncollinear acousto-optic filter in accordance with the present invention.

Referring to FIG. 5, an acoustically resonant noncollinear acousto-optic filter is shown diagrammatically. The filter comprises an anisotropic medium, such as a birefringent crystal 51, an input polarizer 52, and an output analyzer 53. A piezoelectric transducer 54 is bonded to the birefringent crystal 51 on a predetermined surface 55. The end surface 56 is chosen to be as parallel as possible to the surface 55, to form an acoustic resonator. The transducer 54 is connected to an RF frequency synthesizer 57. Acoustic waves are generated by the transducer and set up standing waves in the acoustic resonator. A light beam 58, from a light source 59 is polarized by the polarizer 52, enters the crystal 51, is diffracted by the acoustic standing waves, and is passed through the output analyzer 53 as the filtered light beam 60.

For the noncollinear acousto-optic filter, the acoustic frequency and optical wavenumber are related by $$\Delta \nu = (f_a/V\Delta n)(\sin^4 \theta_i + \sin^2 2\theta_i)^{-\tfrac{1}{2}} \quad (5)$$

where $\theta_i$ is the (polar) angle of the light beam incidence. That is, $\theta_i$ is the angle between the incoming radiation rays, 58 or 64, and the natural quartz crystal optical axis "z". Thus, the separation in wavenumber between the optical peaks of the optical response comb due to the multiple acoustic resonances in an acoustically resonant noncollinear filter is given by $$\Delta\nu = \frac{1}{2d\Delta n}(\sin^4\theta_i + \sin^2 2\theta_i)^{-\frac{1}{2}} \quad (6)$$

The width of the filter optical passband corresponding to a single audio resonance peak (i.e., FWHM) is given by $$\delta\nu = \frac{1}{2l\Delta n \sin^2\theta_i} \quad (7)$$

Equations (6) and (7) yield the effective finesse of the acoustically resonant noncollinear acousto-optic filter, i.e., $$F = l/d(1 + 4\cot^2\theta_i)^{-\frac{1}{2}} \quad (8)$$

To ensure sufficient overlapping of successive bandpass responses, again a small finesse, preferably less than about 0.5, and most preferably an effective finesse of about 0.25 is required. In the case of the noncollinear filter, this is achievable even with $l=d$ if $\theta_i$ is small. For instance, when $l=d$ and $\theta_i = 27.3°$, Eq. (8) yields $F=0.25$ the optical spectral response is the same as shown in FIG. 4d.

Notice that for the special case of a collinear filter, where $\theta_i = 90$, the effective finesse of equation 8 reduces to $F = l/d$ as described above.

Figure 6:
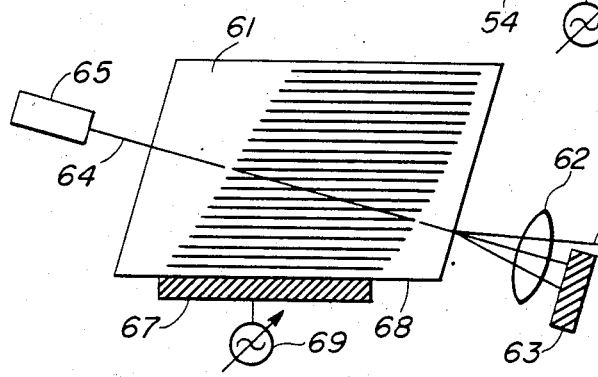
FIG. 6 is a schematic diagram, according to this invention, of a second embodiment of an acoustically resonant noncollinear acousto-optic filter.

FIG. 6 shows a second embodiment of an acoustically resonant noncollinear acousto-optic filter. This configuration is basically the same as that shown in FIG. 5 and includes a crystal 61 having piezoelectric transducer 67 bonded to crystal surface 68 and an RF frequency synthesizer 69 connected to the transducer. A light source 65 produces input light beam 64. Instead of polarizers and analyzers, a lens 62 and a stop 63 are provided and the filtered light beams 66 are spatially separated from the incident light beam 64.

Note that the parameters "d" and "$\theta_i$" are design parameters. It is not intended that the parameters be continuously adjustable. That is, their values are calculated, and the crystal and/or prism are manufactured to particular values.

I claim:

1. A tunable acousto-optic filter having a birefringent acousto-optic crystal and, optionally, acoustic prism means for coupling a light beam along a predetermined axis through said birefringent crystal, said crystal and said optional prism coupler forming an acoustic resonator;
    means for separating the light beam entering said crystal from the filtered light beam exiting said crystal;
    acoustic drive means for exciting a standing acoustic wave in said filter;
    means for varying the discrete resonant acoustic frequencies of said standing acoustic wave;
    means to vary the frequency of said acoustic drive means to vary the center wavelength of the optical filter passband;
    means for reducing the effective finesse of said filter to a value of less than 0.5, thereby to reduce ripples in the tuning bandpass response of said filter;
    the said effective finesse, F, of said filter being given by the relation, $$F = (l/d)(1 + 4\cot^2\theta_i)^{-\frac{1}{2}}$$

wherein "l" is the acousto-optic interaction length for the light beam,
   "d" is the acoustic path length of the acoustic resonator, and
   "$\theta_i$" is the polar angle of the light beam incidence.

2. Apparatus as recited in claim 1 wherein said filter is collinear;
    said means for coupling a light beam comprises said crystal, said acoustic prism means, and an optically reflective surface at one end of said birefringent crystal for internally reflecting light from within said crystal;
    said means for separating the light beam entering said crystal from the filtered light beam exiting said crystal comprises polarizing means for polarizing said light beam entering said crystal and for analyzing said reflected and filtered light exiting said filter;
    said acoustic drive means comprises an acoustical transducer in intimate contact with said reflective surface at the end of said filter distal from the end receiving said light beam;
    said transducer, acoustic prism means, birefringent crystal and reflective surface being aligned; and
    in which said means for reducing the effective finesse of said filter includes said acoustic prism means, to define, together with said crystal, a composite acoustic resonator structure having a predetermined acoustic length corresponding to said finesse of less than 0.5.

3. Apparatus as recited in claim 1 wherein said filter is collinear;
    said acoustical path comprises a crystal and an acoustical prism aligned therewith;
    the length of said path is the sum of the lengths of said crystal and said prism;
    said means for coupling a light beam comprises an optical mirror within said acoustical path, said mirror being inclined substantially 45 degrees relative to the direction of propagation of said light through said acoustical path;
    means for causing said light beam to enter one end of said birefringent crystal, to traverse an optical path within said crystal, and to be reflected from said mirror and out of said acoustical path;
    said means for separating the light beam entering said crystal from the filtered light beam exiting said crystal comprises polarizing means in said light path before the entrance to said crystal and in the path of reflected light from said mirror;
    said acoustic drive means comprises an acoustical transducer in intimate contact with said acoustical prism and aligned therewith to deliver acoustical waves through said prism and said crystal;
    said means for reducing the effective finesse of said filter includes said acoustic prism means to define, together with said crystal, a composite acoustic resonator structure having a predetermined acoustic path length corresponding to said finesse of less than 0.5.

4. Apparatus as recited in claim 1 wherein said filter is noncollinear, in which said birefringent acousto-optic crystal has at least first and second parallel surfaces thereon to form a path and resonant chamber for acoustic waves, said crystal has third and fourth additional parallel faces thereon forming said crystal into a parallelogram cross-section, said interacting light beam being directed normal to said third and fourth faces with said light entering said crystal through said third face and exiting said crystal through said fourth face, said acoustic drive means comprising a piezoelectric crystal in intimate contact with said second face, the distance between said first and second faces and the polar angle of said incoming light being adjusted to cause the finesse to be less than 0.5.

5. Apparatus as recited in claim 4 and further comprising means for polarizing said light beam, and polarization analyzing means wherein predeterminedly polarized filtered light is transmitted through said analyzing means.

6. Apparatus as recited in claim 4 wherein said interacting light beam is unpolarized, and further comprising optical stop means to separate out the filtered light beam from other beams exiting said crystal.

7. Apparatus as recited in claim 1 wherein said filter is collinear;
said means for coupling a light beam comprises said crystal, and said acoustical prism means;
said means for separating the light beam entering said crystal from the filtered light beam comprises polarizing means for polarizing said light beam entering said prism and said crystal, and a second polarization analyzer for transmitting only filtered light with a predetermined polarization;
said acoustic drive means comprises an optically transparent acoustical transducer in intimate contact with the optically down-path end of said crystal.

8. A noncollinear tunable acousto-optic filter comprising:
a birefringent acousto-optic crystal having parallel end faces forming an acoustic resonator;
means for transmitting a light beam through said crystal, means for exciting a standing acoustic wave in said crystal;
means for varying the discrete resonant acoustic frequencies of said standing acoustic wave to vary the center wavelength of the filter passband;
the length of the acoustical path and the polar angle of incidence of said light beam being predeterminedly controlled to control the effective finesse of said filter to less than 0.5, thereby to reduce ripples in the tuning bandpass response of said filter.

9. A filter as recited in claim 8 including polarizer means and analyzer means for separating the filtered output light beam exiting said crystal from the incident light beam entering said crystal.

10. A filter as recited in claim 8 including means for spatially separating the filtered output light beam exiting said crystal from the incident light beam entering said crystal.

11. A filter as recited in claim 8 wherein said effective finesse has a value of about 0.25.

* * * * *